United States Patent [19]

Miller et al.

[11] Patent Number: 4,694,295
[45] Date of Patent: Sep. 15, 1987

[54] VEHICLE BLIND SPOT DETECTOR

[76] Inventors: Brett A. Miller, 2210 N. King Rd., Marion, Ind. 46952; Daniel Pitton, 2046 NW. 43rd Ter., Apt. 1, Lauderhill, Fla. 33313

[21] Appl. No.: 863,573

[22] Filed: May 15, 1986

[51] Int. Cl.$^4$ ............................................. G08G 1/00
[52] U.S. Cl. .................................. 340/903; 340/52 H
[58] Field of Search ..................... 340/903, 904, 52 H, 340/901, 556; 342/70, 72, 27; 367/909, 93; 250/341

[56] References Cited

U.S. PATENT DOCUMENTS

| | | | |
|---|---|---|---|
| 3,152,317 | 10/1964 | Mayer | 340/34 |
| 3,681,750 | 8/1972 | Larka | 340/904 |
| 3,942,601 | 3/1976 | Smith | 180/82 |
| 4,026,654 | 5/1977 | Beaurain | 342/27 |
| 4,028,662 | 6/1977 | Young | 340/904 |
| 4,232,286 | 11/1980 | Voll | 340/51 |
| 4,260,980 | 4/1981 | Bates | 340/904 |
| 4,349,823 | 9/1982 | Tagami et al. | 340/904 |
| 4,407,388 | 10/1983 | Steel | 180/271 |
| 4,447,800 | 5/1984 | Kasuya et al. | 340/904 |
| 4,450,430 | 5/1984 | Barishpolsky et al. | 340/904 |
| 4,490,716 | 12/1984 | Tsuda et al. | 367/909 |
| 4,626,850 | 12/1986 | Chey | 340/904 |

FOREIGN PATENT DOCUMENTS 2131642  6/1984  United Kingdom ................ 340/901

Primary Examiner—Jerry W. Myracle
Assistant Examiner—Hezron E. Williams
Attorney, Agent, or Firm—Oltman and Flynn

[57] ABSTRACT

The driver, in trying to manage the directional control of his vehicle, is often seen rotating his head or torso beyond 90 degrees (past perpendicular) in an effort to gain intelligence about what competing vehicles are flanking his "blindsides." Such a competing vehicle may occupy that area in the "blindside" (left, right or both sides past perpendicular) not directly observable through the rear view mirror. The requirement to make an extraordinary inspection of the vehicle "blindside" is often exacerbated by the poor design utility of the vehicle itself. Those who are physically unable to check the "blindspot" (such as the elderly) knowingly risk collision. The instant invention is the first high-technology effort to address a solution to this problem. A sequentially operating dual sensor technology is used. The first sensor effort takes place as a photonic event. An infrared light emitting diode (IRLED) is coupled to an infrared sensitive phototransistor (PT) or photo-darlington (PD) through the reflectance of incident light energy from the target vehicle. Once detected, a preset time delayed switch is made which activates operation of the second sensor. The second sensor is ultrasonic. The vehicle operator is actually given the distance (in feet) between his vehicle and the threat obstacle.

9 Claims, 14 Drawing Figures

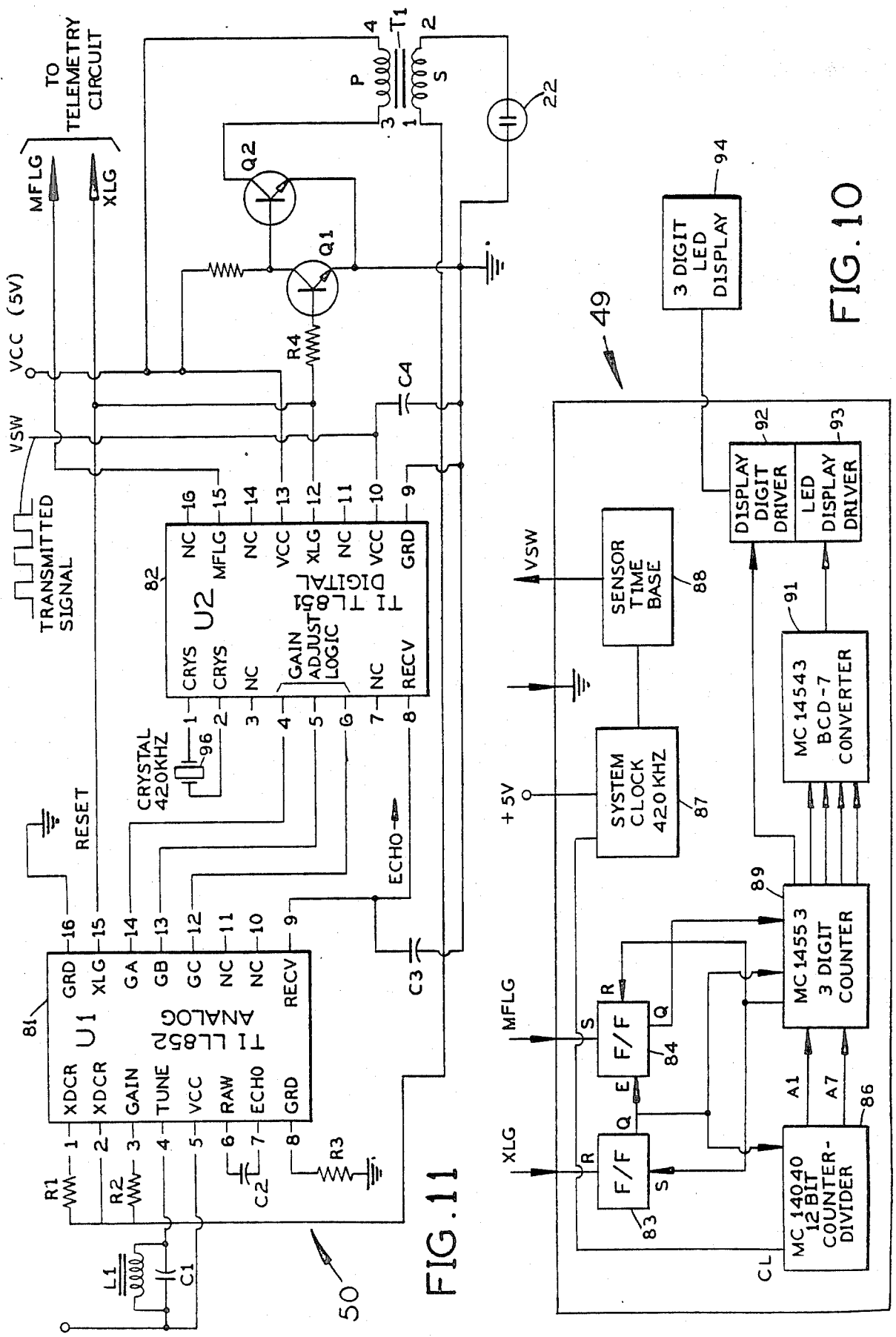

VEHICLE BLIND SPOT DETECTOR

FIELD OF THE INVENTION

The present invention relates to vehicle safety devices, particularly to driver blindspot detection sensors.

BACKGROUND OF THE INVENTION

Driving a motor vehicle in modern traffic conditions is a very complicated and dangerous task. The driver must be aware of all oncoming road hazards and traffic control devices including stopped cars and red lights. Highway driving poses the ultimately dangerous task of watching oncoming road hazards while at the same time looking backwards. It is necessary to look both sideways and backwards before safely changing lanes on a highway. A failure to properly look both sideways and backwards before changing lanes can lead to serious high speed accidents. Such accidents often cause serious bodily harm or death.

Rearview mirrors located both inside the windshield and on the sides of vehicles so far have been the only widely accepted means for detecting vehicles on the sides or behind the driver's vehicle. All such rear view mirrors known to the applicant leave at least one blind spot where the driver cannot detect a nearby vehicle. These blind spots generally exist right next to the rear fenders of a car or next to the rear wheels of a truck. Sometimes an entire car or motorcycle can be driving right alongside the driver's car totally undetectable by the driver even after checking his rear view mirrors. Various range detecting technologies have been applied to motor vehicles to assist a driver to control his vehicle.

U.S. Pat. No. 3,152,317 discloses a following vehicle distance sensing means using rearward facing lamps on the lead vehicle and a forward facing light angle detector on the following vehicle. A circuit computes the distance from the varying angles of convergence of the two rearward facing lamps.

U.S. Pat. No. 3,942,601 discloses a personnel proximity detection system for trucks having hazardous machinery on the outside. Photoelectric or ultrasound or capacitance antenna means are used to trigger safety shut-offs when a person is too close to the machinery.

U.S. Pat. No. 4,232,286 discloses an electronic sensor on a vehicle which is used to indicate when a metal pipe imbedded in a rubber bumper moves closer to the vehicle.

U.S. Pat. No. 4,407,388 discloses a dual sensing system on a truck while reversing with means to stop the truck when a hazard is sensed. A radar and an infra red detector are used.

None of these devices is designed to mount at the rear of a car or truck and provide the driver with a dependable means to detect a vehicle right alongside in the driver's blind spot.

SUMMARY OF THE INVENTION

It is, therefore, the object of the present invention to provide electronic means to detect vehicles alongside a driver's vehicle located in the area commonly called the blind spot.

It is another object of the present invention to use dual electronic sensing means to detect vehicles in the blind spot in order to ensure accuracy.

It is another object of the present invention to use one passive detector to initially detect a vehicle, which then by a preset delay, triggers a second active sensor to confirm the vehicle's presence.

Other objects of this invention will appear from the following description and appended claims, reference being had to the accompanying drawings forming a part of this specification wherein like reference characters designate corresponding parts in the several views.

The first sensor effort takes place as a photonic event. An infrared light emitting diode (IRLED) is coupled to an infrared sensitive phototransistor(PT) or photodarlington(PD) through the reflectance of incident light energy (wavelength at above 8000 angstroms) from the target vehicle. This IRLED/PT device pair must not be confused with an infrared (single or array) bolometer type sensor, whose response to radiant infrared energy is much slower.

Once detected, a timed delay switch is made which activates operation of the second sensor. The second sensor is ultrasonic, using either piezo or leaf transducers coupled mechanically to the air. The ultrasonic switch event activates indicator output which, by virtue of the multiplicity of pulsed wavefronts (40 KHz) reflected from the target, allows precise rangefinding telemetry. The vehicle operator may be given the distance (in feet) between his vehicle and the threat obstacle.

In review, the above generalized theory can be paraphrased as follows. The IRLED sensor initiates the sensor cycle through the emission and reflected detection of incident infrared light energy off the target vehicle occupying a traffic blindspot. This sensor activates the ultrasonic sensor, which provides actual range telemetry to the vehicle operator.

The IRLED sensor by itself could not, by virtue of its inherent limits, function satisfactorily in a rangefinding capacity. Though the IRLED sensor can be used to activate an indicator output to the vehicle operator, it can be demonstrated that the use of light reflective technology alone is prone to many false alarms in the environment of street traffic. The interface between the LED photonic sensor and the ultrasonic sensor is arranged to provide the proper delay for turning on the ultrasonic sensor. Such delay can suppress false or invalid indicator output. Interface delay may be implemented by means of an electromagnetic relay (rather than the solid state variety) due to the saturation time of the coil before contacts are made. This coil saturation time, typically approaching 200 milliseconds, approaches the pulse delay of the ultrasonic transmit cycle of the ultrasonic sensor. Thus, a rapidly moving vehicle or object that does not expose itself to the combined sensor "window of response" long enough, may turn on both the LED sensor and (200 milliseconds later) the ultrasonic sensor, but would conceivably not register a ranging distance on the indicator output as measured ultrasonically. The use of other delay techniques is within the scope and claims of this invention.

The vehicle operator, has the option of two indicator modes. The default mode is a visual display showing either a direct digital readout of the target vehicle in feet. The optional mode will allow an additional audio "beeper" indication of a sensor event ONLY when the turn signal lever is activated (e.g. in preparation for a lane change). The location of the indicator output lamps is an ergonometric consideration. The mounting location of the indicator output lamps should, ideally, be in a line of sight within the field of view of the vehicle operator without undue rotation of the head or torso.

Used as a safety device, the present invention can only enhance the driving experience given the hazardous uncertainties of today's traffic environment.

BRIEF DESCRIPTION OF THE DRAWINGS

FIG. 10 is a functional block diagram of the sonic telemetry decode and receiver circuit.

FIG. 11 is a functional block diagram of the sonic transmitter circuit.

DETAILED DESCRIPTION OF THE PREFERRED EMBODIMENTS

Before explaining the disclosed embodiment of the present invention in detail, it is to be understood that the invention is not limited in its application to the details of the particular arrangement shown, since the invention is capable of other embodiments. Also, the terminology used herein is for the purpose of description and not of limitation.

Figure 1:
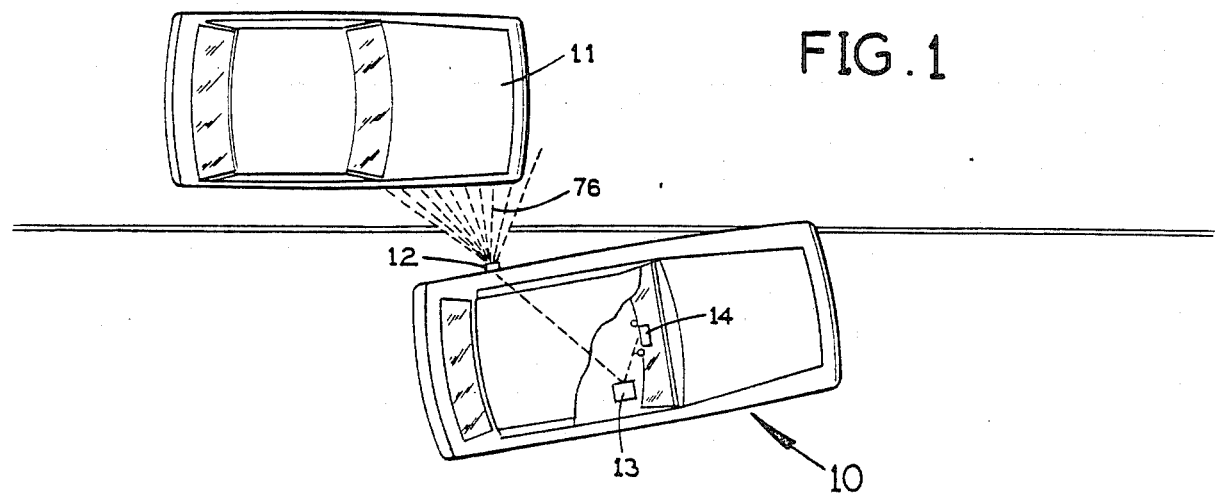
FIG. 1 is a top-down view of two vehicles on converging courses, wherein one of the vehicles is equipped with a left hand side blind spot sensor.

In FIG. 1, two vehicles 10 and 11, the former having a blind spot sensor 12 on its left hand side, are on converging courses. The blind spot sensor, emitting and receiving both infrared light and supersonic sound pulses, measures the distance to the coverging vehicle 11, and when the distance is less than a given distance a warning is indicated to the driver of the vehicle 10.

The warning may take the form of a visual indication, combined with an audible indication. The warning indication may take any one of a number of forms. In one preferred form, (FIG. 3), a left and right side numerical display 15 showing distance e.g. in feet to the converging vehicle 11, may be provided at a location conveniently visible to the driver. An audible signal may be emitted from a warning sounder 20. The numerical display 15 positioned to the side from which the converging vehicle approaches will be the one indicating potential collision. In another form shown in FIG. 4, one of two light indicators 24, shaped e.g. as arrows may point to the side facing the converging vehicle 11.

The audible warning may issue prior to the lighted warning indication, or may issue at the same time. The audible warning may optimally have an adjustment for loudness, including a complete cut-off switch.

Figures 2, 3, 4:
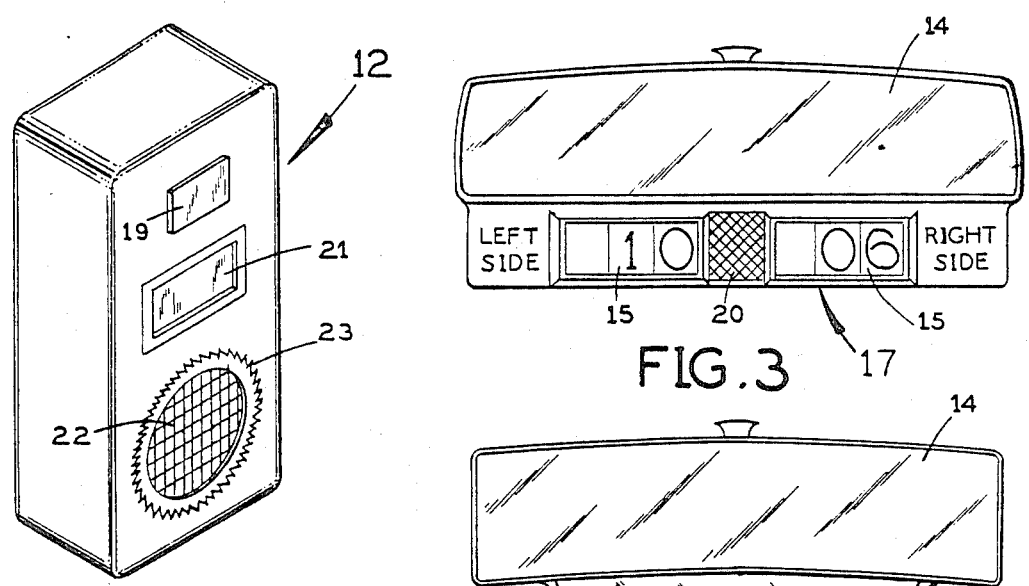
FIG. 2 is a perspective view of a blind spot sensor.
FIG. 3 is an elevational view of a rear view mirror having distance indicators installed below the mirror.
FIG. 4 is an elevational view of a rearview mirror having proximity inidicators installed below the mirror.

FIG. 2 shows the blind spot sensor 12, which advantageously is mounted at both sides of the vehicle 10. It may be recessed into the outer surface of the vehicle 10, having only one opening for the infrared emitter 19, one for the infrared detector 21, and one for the combined ultra-sound send/receive transducer 22. The transducer 22 is advantageously of the type that includes a piezoelectric element for converting electrical input pulses or bursts of AC-energy into acoustic sound bursts and coupling them to the air. The sensors 12 are advantageously disposed toward the rear end of the vehicle as seen in FIG. 1.

The transducer 22, when constructed as a piezo-electric device may not be operative at temperatures below a certain degree. In such cases, a small heating element 23 may be installed proximal to the transducer, and be controlled by a thermostat in conventional manner.

Figure 5:
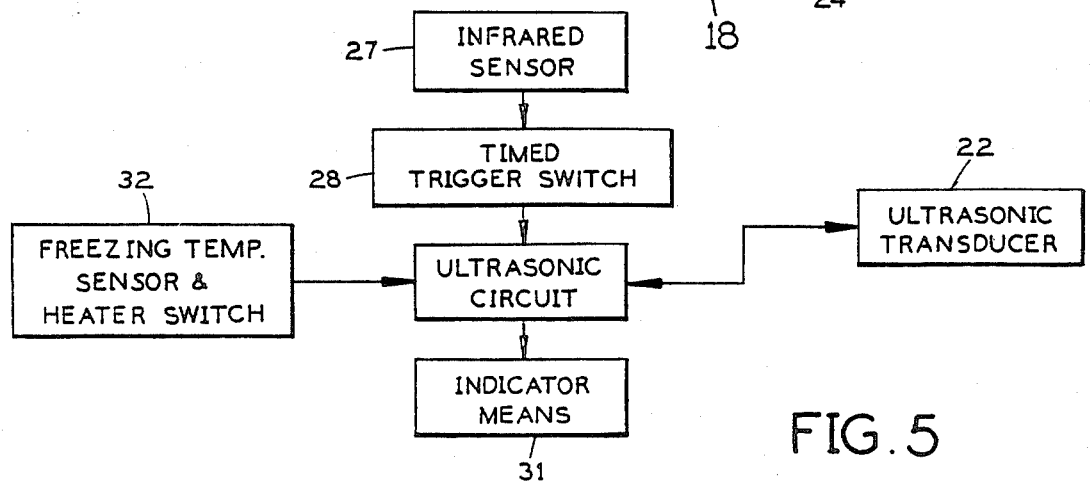
FIG. 5 is a simplified block diagram of the main parts of the invention.

FIG. 5 shows the major elements of the invention, namely the infrared sensor 27, which includes the infrared light emitter 19, the infrared light detector 21, and the electrical drive circuit therefor. A timed trigger switch 28 that responds to a signal from the infrared sensor 27, indicates that the converging vehicle 10 is within a given trigger distance T, and activates the ultrasonic transducer 22 after a preset time delay D. After elapse of the delay D, the ultrasonic transducer 22, with its associated control circuits is activated and starts sending distance-ranging sound bursts which are reflected by the converging vehicle 11 as echoes returning to the transducer 22 after a ranging time R, equal to twice the sound propagation delay between the two vehicles 10 and 11. The electric control circuitry is capable of measuring the propagation delay and thereby measuring the distance to the converging vehicle 11.

The timing provided by the timed trigger switch 28 serves to prevent random infrared light flashes, created in the environment of the vehicle 10, from randomly activating the infrared receiver 21, which in turn prevents the latter from randomly activating the infrared receiver 21, which in turn prevents the latter from randomly responding to random sounds and noises generated in the environment of the vehicle 10, which would distract the driver by causing false indications of possible collisions with other vehicles.

Figure 6:
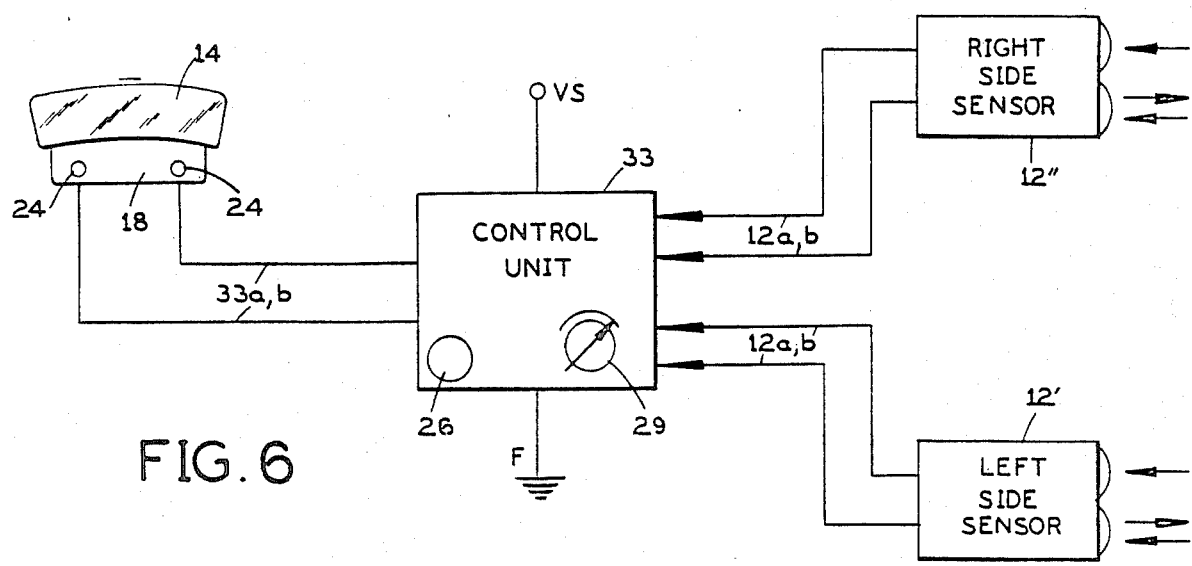
FIG. 6 is a simplified circuit block diagram of the invention.

FIG. 6 shows diagrammatically the structure of the invention. The left and right side sensors 12' and 12", respectively, are connected by a number of wires 12a, b to the control unit 33. The control unit 33 is connected to frame ground F and a supply voltage Vs which may advantageously be the vehicle's main power system, and by wires 33a, b to the alarm indicator 18, disposed proximal to the rearview mirror 14, and having two visual indicators 24. An audible buzzer 26 is shown in the control unit 33 and a buzzer sound level control 29.

Figure 7:
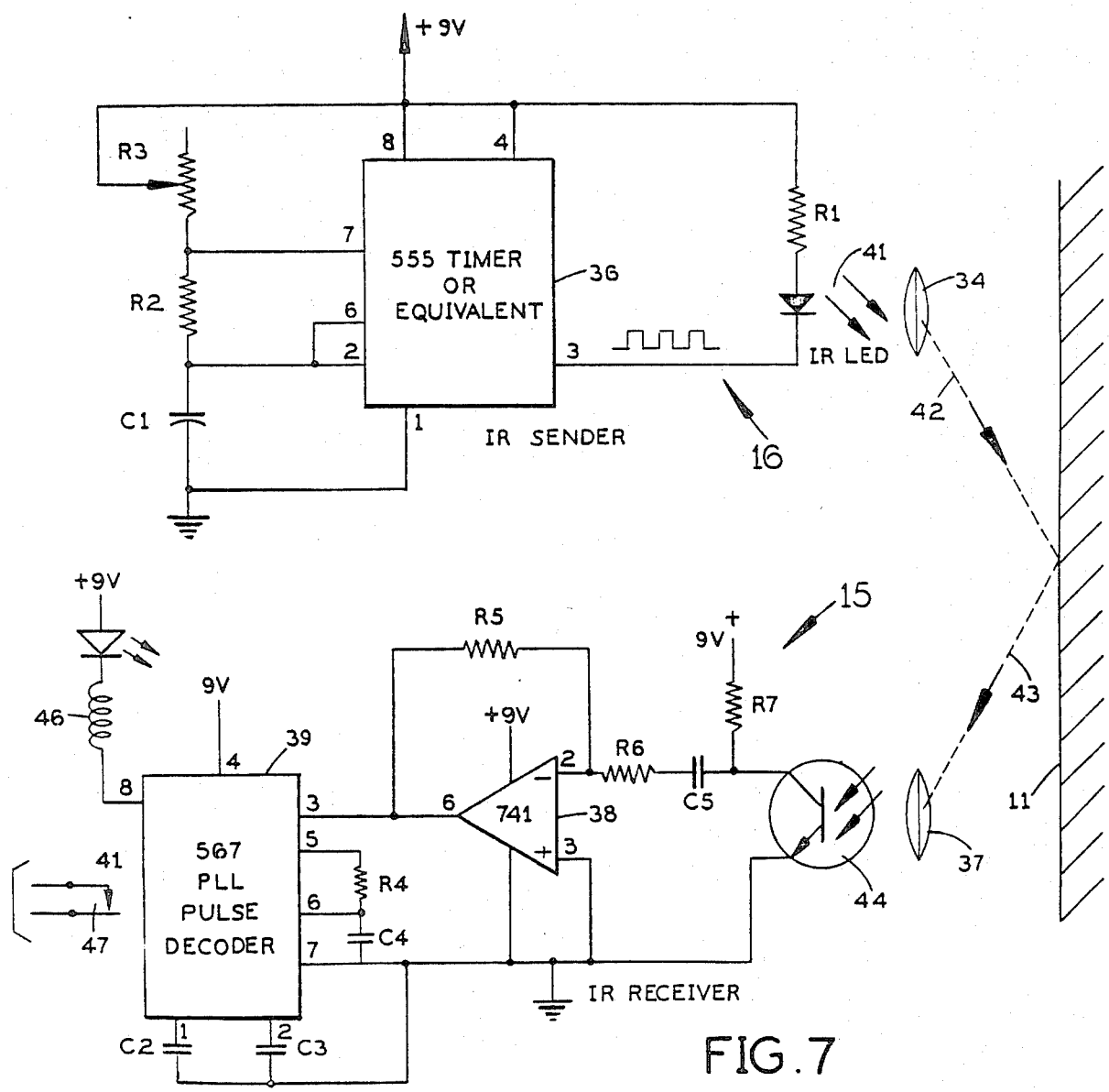
FIG. 7 is a simplified circuit diagram of one of the preferred embodiments of the invention.

FIG. 7 shows diagrammatically the main parts of the infrared sensor 27. The sender portion includes an electronic timer 36, advantageously including a well-known timer circuit 555, manufactured, e.g. by Signetics or others, which generates a continuous stream of electric pulses at its output pin 3, having a repetition rate determined by the time constant of the capacitor C1 and the resistor R2, connected to pins 1,2 and 7,6 respectively.

An infrared light emitting diode IRLED in series with current-limiting resistor R1, connected to output pin 3 produces a stream of infrared light pulses 41, which emerge through a sending lens 34, disposed in the opening 19 of the sensor 12, resulting in a beam of infrared light pulses being directed toward the facing side of the converging vehicle 11, which reflects the light pulses as a reflected beam, reaching the infrared light detector, seen in the lower part of FIG. 7.

The infrared receiver includes a receiving lens 37, disposed in the infrared light opening 21, sends the received infrared light pulses onto an infrared light transistor 44, which converts the light pulses to electrical pulses that are transmitted to the inverting input 2 of an operational amplifier 38, which amplifies the electrical pulses and sends them from its output 6 to a pulse decoder 39. The pulse decoder 39 may advantageously be constructed as a so-called phase-locked-loop decoder, e.g. of the well known type 567, also manufactured by Signetics and others. Upon receiving a train of input pulses that is sustained for a given length of time, and having a pulse repetition rate of a given frequency, the pulse decoder 39, which is tuned by the capacitors C2, C3 and C4 and resistor R4 to respond selectively to the received pulse train by placing a ground potential on pin 8. This ground potential energizes a relay coil 46, which in turn, after a delay determined by the relay constant, including the self-inductance of the relay coil 46, operates contacts 47. The operating delay is typically approximately 200 milliseconds. The delay may alternatively be controlled or augmented by a timing circuit of the 555 type or equivalent.

The total delay, from the time the first reflected infrared pulses 43 of sufficient intensity level to activate the pulse decoder 39 till closure of the contacts 47, is determined by the total delay of the pulse decoder 39 and the relay coil 46. This total delay is important in preventing the contacts 47 from randomly responding to external random light flashes. The operation of the 555 timer 36 and the 567 pulse decoder 39 is described in detail in manufacturers application books, e.g. Signetics Corporation's applications Manual "Digital Linear MOS", copyrighted 1974. The delay components together form the timed trigger switch 28, seen in FIG. 5.

The delayed closure of contacts 47 activate the ultrasound ranging part 22, shown in more detail in FIGS. 8, 9, 10 and 11.

Figure 8:
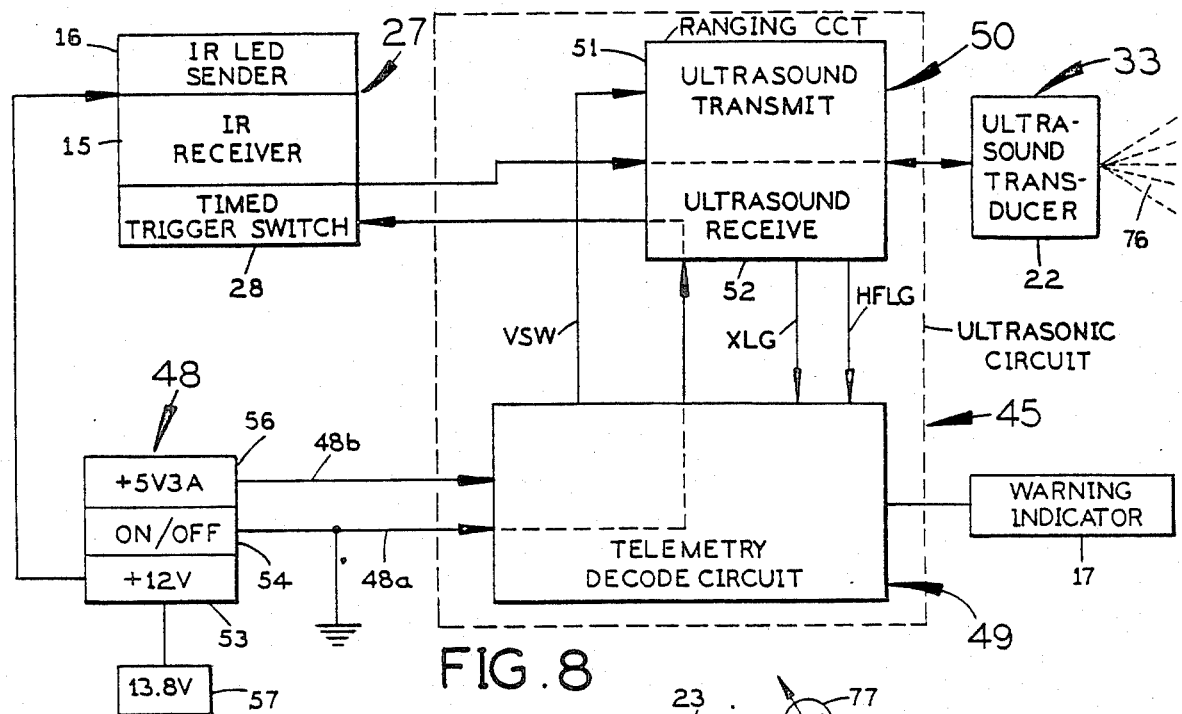
FIG. 8 is a simplified block diagram of the invention showing the flow of information between the blocks.

FIG. 8 shows broadly the structure of the ultrasound ranging part 45, a power supply 48, consisting of a 12 volt section 53, a 5 volt regulator section 56, an on/off switch 54 receiving its power from the vehicle's main power bus 57. The power supply 48 extends a ground bus 48a and a 5 volt power bus 48b to the remaining parts of the system. An ultrasonic circuit 45 includes a telemetry decode circuit 49, and a ranging circuit 50 which includes an ultrasound transmit circuit 51 and an ultrasound receive circuit 52. The ultrasonic circuit 45 is advantageously constructed as a single circuit board disposed in the control unit 13. The ranging circuit 50 is connected to the ultrasound transducer 22, to one side, and to the other side to the infrared transmit and receive unit 27, which includes the IRLED sender 16 and the IR receiver 15, described above, and the timed trigger switch 28 also described above.

Figure 9:
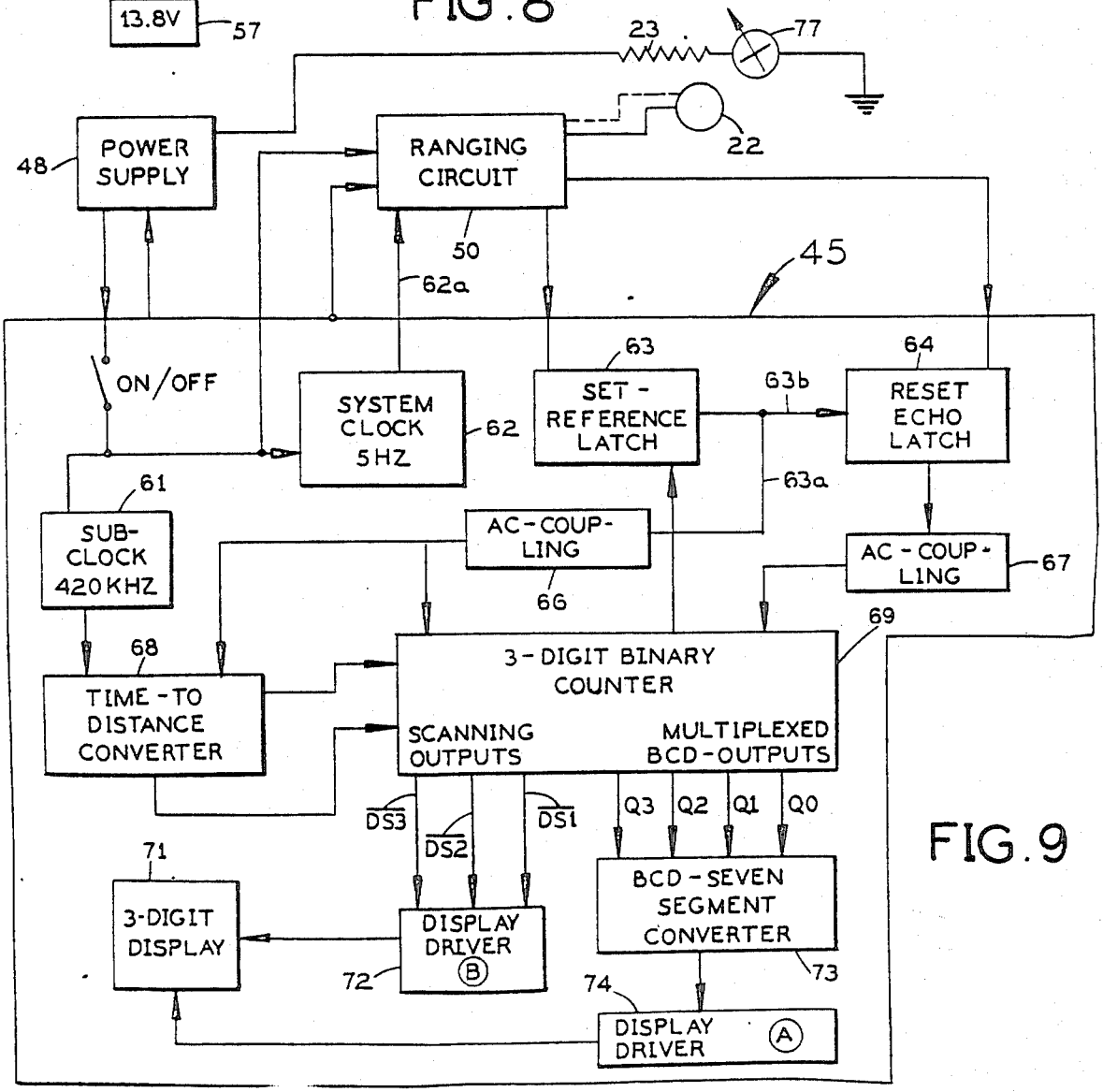
FIG. 9 is a detailed block diagram of the invention showing the major function blocks and their interconnections.

The ultrasonic circuit 45 is shown in greater detail in FIG. 9. It is connected to the power supply 48 described above and the ranging circuit 50, also described hereinabove.

The ultrasonic circuit 45 seen in FIG. 9 includes a subsystem clock 61, generating a 420 KHz clock signal which is received by the system clock 62, which divides the 420 KHz clock to a 5 Hz clock, which in turn governs the repetition rate of the ranging circuit 50. As a result, the transducer 22 sends every 1/5 of a second a burst of ultrasound pulsed energy which is directed in a wide-angle beam 76 toward the converging vehicle. (FIG. 1).

Ranging of the distance to the converging vehicle is performed by means of a set reference latch 63 that is triggered on at the moment an ultrasound burst is transmitted. The set reference latch 63 enables the drive input of a 3-digit binary counter 69 via lead 63a and AC-coupling 66 so that the binary counter 69 starts counting at a given rate the moment the ultrasound burst is transmitted. At the moment of transmitting the ultrasound burst, a reset echo latch 64 is enabled via lead 63b, so that, when the echo is returned the reset echo latch 64 is set, which in turn stops the 3-digit counter 63 via AC-coupling 67. The 3-digit counter 69 is driven at a clock rate such that each clock pulse corresponds to the travel time of sound for travelling the distance of e.g. 0.2 feet, which is approximately 2.174 milliseconds. This clock frequency is generated by the time-to-distance converter 68 from the 420 KHz clock received from the subclock 61. The required clock frequency for driving the counter in increments of 1/10 feet, accordingly is 460 Hz, which is produced in the time-to-distance converter 68. The count of the binary counter 69 the moment the echo is returned and setting the reset echo latch 64, accordingly represents range in tenths of feet. This count is displayed on the 3 digit display 71, driven by the display driver B which, by multiplexed scan, enables a digit at a time, controlled by scanning outputs DS1, DS2 and DS3. The binary outputs Q0-Q3 from the counter 63 are transmitted to the display 71 via BCD-seven segment converter 73, which converts the multiplexed digital outputs Q0-Q3 into seven-segment display code and display ddriver 74.

It follows that for two blind spot detectors, two ultrasonic circuits 45 will be required, one for each side. For the sake of economy, some of the parts may be shared between the two circuits such as the clocks and power supply and others.

In order to keep the transducer 22 operational during freezing conditions, a heating element 23, controlled by a thermostat 74 may be installed proximal to each ultrasound transducer 22.

FIG. 10 shows the telemetry decode circuit 49 in more detail, and FIG. 11 shows the ranging circuit 50 briefly described hereinabove. The ranging circuit 50 is based on two integrated circuits, the analog circuit U1 and the digital circuit U2. The integrated circuits U1 and U2 are available from Texas Instruments, Inc. and are identified as TI LL852 and TI TL851, respectively. Similar circuits are available from other manufactureres in analogous embodiments.

The the ranging circuit of FIG. 11 including all the necessary components, such as resistors R1-R5, capacitors C1-C4, an inductor L1, and transducer 22. The transducer 22 is available e.g. from Polaroid Corp. under type number 604142. It requires nominally a 50 KHz, 300 V driving signal which is provided via a matching transformer T1, taking the output signal from the digital circuit U2, pin XLG and amplifying it in the transmitter circuit that includes power transistors Q1 and Q2.

The module U2 operates to generate the drive signal XLG, control the timing thereof by means of a 420 KHz crystal 96 to produce an output square wave signal seen in FIG. 11a, which has a repetition rate of 200 milliseconds. The output pulse VSW at pin 10 of U2, having a repetition rate of 200 MS enables pin 12, XLG of U2 by switching current to ground through transformer T1, having a step-up turns ratio 1:70. The resultant voltage surge in the range of 350–400 volts at approximately 2.5 amps drives the transducer 22, which in turn emits sound waves (76 in FIG. 1) which are directed to and partially reflected from the exterior surfaces of a converging vehicle. The return lead 1 from the transformer secondary X is connected to pin 1 and 2 of the analog circuit U1 and represents the echo signal received by the transducer 22. This echo signal, although attenuated, is filtered to reduce noise, and amplified in circuit U1 and appears again as signal RECV at pin 9 of module U1 (81). The receive module U1 has variable gain control, which causes the gain to increase as the time to the return of the echo increases and therefore provides continued good echo reception, independently of the distance. The gain control is effected via leads GA, GB, GC from a gain adjustment logic in the transmit module U2 (82).

The echo signal RECV 16 applied to pin 8 of transmit module U2, is further processed through an analog/digital converter and appears again as an output MFLG at pin 15 of module U2.

Of the two signals XLG and MFLG, as described hereinabove, XLG represents the start of the transmitted pulse from the transducer 22 and MFLG represents the received echo. MFLG therefore represents, related to the pulse XLG, the distance to the target, namely the converging vehicle 11.

FIG. 10 is a block diagram of the telemetry decode circuit 49 which operates to receive the two pulses XLG and MFLG and to compute the distance to the target from the time difference between the two pulses and to convert the time distance into a digital display for showing the distance, e.g. in feet. The pulse XLG is connected to the reset input R of a flip-flop 83 having an output Q, which in turn enables a counting circuit consisting of the 12-bit counter-divider (divide by 128) (ref. 86) and the 3-digit counter 83, and also enables a second flip-flop 84 at the input E thereof. The second flip-flop 84 has another input S connected to the pulse MFLG, and an output Q which is connected to a stop input to the counter 89. The two counters are connected in cascade with the first one 86 driving the second one 89 via leads A1 and A7. The counting circuit is driven by clock pulses having a repetition rate equal to two times the propagation times of sound for a distance of one foot or some fraction thereof, e.g. 1/10 thereof. As a result, as described hereinabove, upon receipt of the first pulse XLG indicating the start of a sound pulse moving toward the target, the counter circuit starts running driven by the clock UL. The second pulse MFLG, created by the reflected echo pulse stops the counting circuit. The number of clock pulses counted by the counter represent the distance to the target in feet or in fractions thereof. The count, stored momentarily in the counter 89 is converted to binary-coded decimal in the converter 91, which in turn operates a display driven circuit consisting of the display digit driver 92 and the LED display driver 93. The latter two circuits in turn operate in conventional manner a three-digit LED display 94. Upon setting the display 94, the flip-flop 83 is again set, and flip-flop 84 is reset by a pulse from counter 89, and are then ready for the next ranging cycle.

The following timing information should be noted:

The telemetry decode board accepts 2 signals from the digital module (U2): XLG which acts as a reset, and MFLG, which together render the prime distance data. Additionally, the TDB can mount the VSW (Timebase) circuitry, which drives the transmit circuitry on page 5.

The telemetry decode circuit 49 performs its decode function by first creating a time-window in which pulse MFLG is accepted to the counter. In conjunction with the 200 MS cycle time of the transmit/receive event, the time window allows for a 178 MS period for receiving pulse MFLG. The time-window, in effect, converts time to distance by utilizing the known speed of sound in air. This constant is output by the counter MC14040 (12 bit binary counter/divider) toggled by the 420 KHz crystal clock which may be received from the ranging circuit 50. The A1 and A7 out puts of the 12 bit counter divider MC 14040, 86, are scanned as inputs to the 3 digit binary counter 89. When scanning is initiated by XLG at A1, the A7 input starts incrementing the counter. When MFLG is latched into the counter, the BCD-to-decimal converter 91 reads the counter output. This value is the actual distance readout displayed to the vehicle operator.

The speed of sound in air constant ($K_{SSA}$), output on the A7 line, is 1.2 inches per clock cycle therefore, a target 10 feet away would require 100 clock cycles (120"/1.2") to be counted before the MFLG stop pulse is received, stopping the counter. Each clock cycle is 178 micro seconds long. (1000 such clock cycles=178 MS, which is the theoretical limit of the time-window duration=to 100 feet). 33 feet is the maximum distance for this sensor configuration. The logical pulse VSW (100 MS, PIN+10) enables transducer transmit at signal XLG (pin 12 of U2) by switching current to ground through transformer (TI). During the transmit enable time 56 pulses at the transmit frequency of 49.1 KHz are transmitted (crystal clocked with 6 MS of VSW pulse leading edge). Concurrently, the receiver is blanked for 1.6 MS by the XLG reset to the analog module U1. After 1.6 MS the receiver changes the configuration of the transducer to a sound receiver. If an echo is not detected within 62.5 MS, PIN 15 with signal MFLG of module U2 will go high (=to ⅓ of 178 MS which is=to ⅓ of 100 ft.). Also, if an echo is detected before 62.5 MS and after 1.6 MS pulse, signal MFLG (U2, PIN-15) will also go high. MFLG is the output logic signal used for decode on the telemetry decode circuit 49. As described hereinabove, the analog module U1 has the capability to adjust its input GNA and bandwidth to compensate for the reduced echo amplitude returning from longer range targets. Maximum gain is engaged as a function of time. The longer the wait for a return echo, the further the distance, the greater the gain. The variable gain logic originates in digital module U2 and consists of timing signals at module U2-Pins, 4,5 and 6 entering the analog chip U1 at pins 14, 13, and 12 as signals GA, GB and GC. Upon detection of an echo at module U1:PINS 1 and 2 filtering of the input signal takes place and the processed echo is output at U1:PIN 9 (RECV). The RECV signal is input to U2:PIN 8 and processed further through an analog/digital converter. This digital signal is output as pulse MFLG. MFLG is further processed in the telemetry decode circuitry 49, although the primary value of MFLG is the timing of the first digitally shaped echo pulse.

Figure 12:
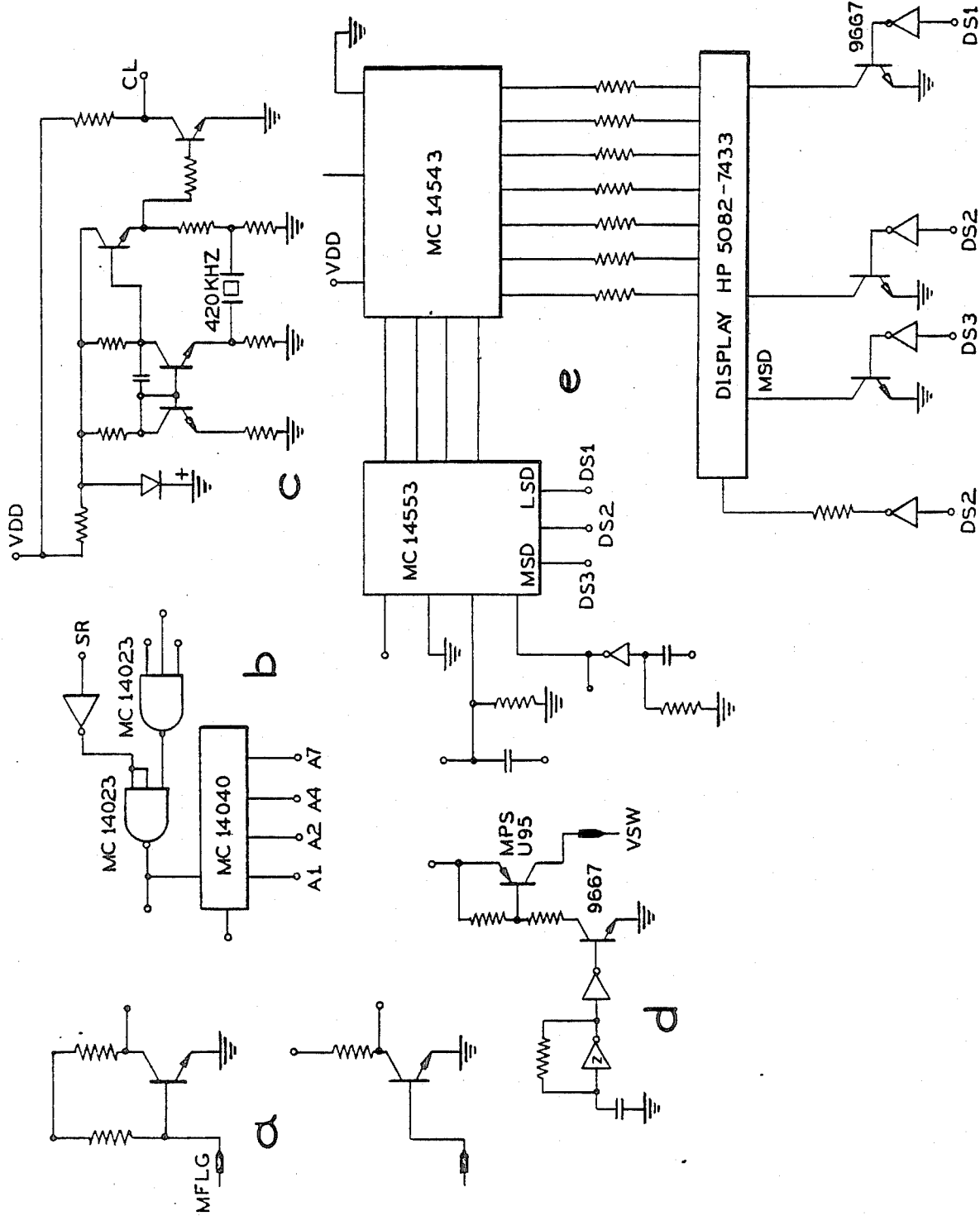
FIG. 12 is a group of detail circuits, that are included in the system.

FIG. 12a–f shows various detail circuits, of which FIG. 12a are conventional NPN-transistor amplifying circuits. FIG. 12b shows details of counter enabling circuit. FIG. 12c is a crystal clock oscillator circuit. FIG. 12d is transducer drive circuit. FIG. 12e shows details of an LED display drive circuit.

Figure 13:
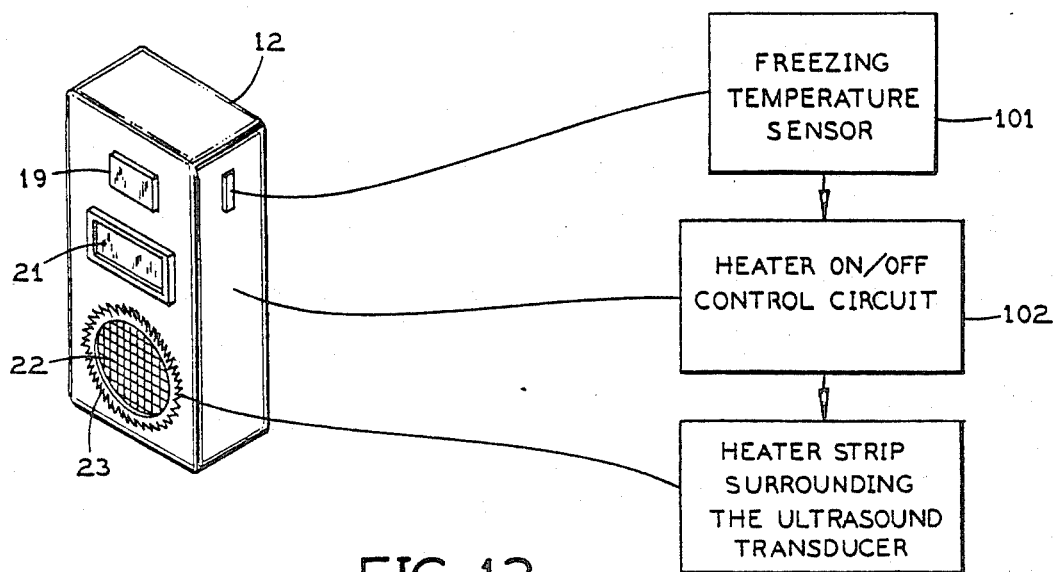
FIG. 13 is a block diagram showing the sensor unit and the connection with the temperature control blocks of the system.

FIG. 13 is a perspective view of the blind-spot sensor 12 with the freezing temperature sensor 101, which engages a heater ON-OFF switch 102, which in turn engages the heater strip 23 surrounding the transducer 22, to prevent inoperability at sub-freezing temperatures.

Figure 14:
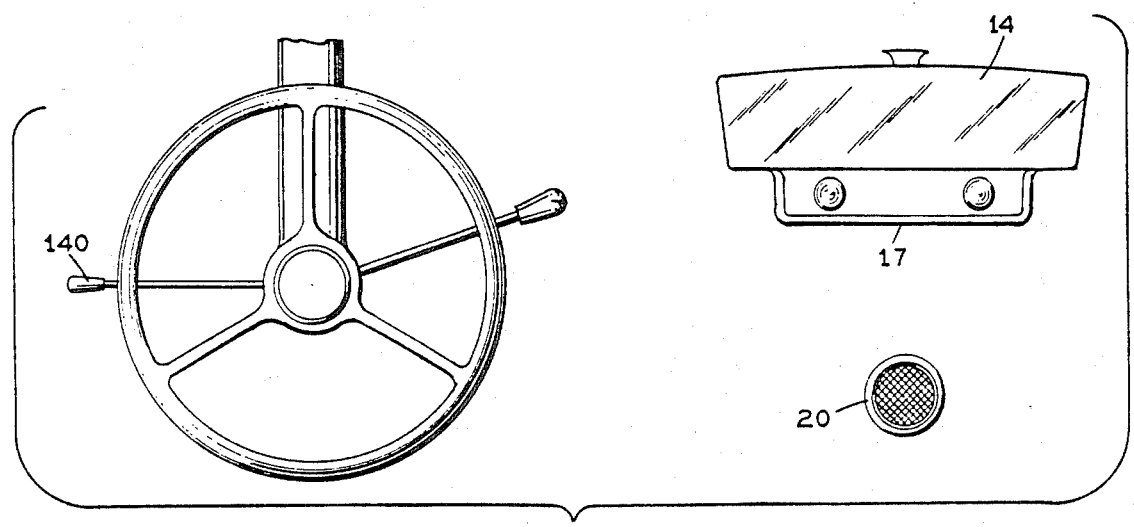
FIG. 14 is a diagrammatic view of the driver's position, showing the steering wheel with turn signal lever, gearshift lever and the rearview mirror with proximity indicators mounted below the mirror.

FIG. 14 shows a driver's position with the collision indicator 17 mounted proximal to the rearview mirror 14 with the alarm sounder mounted proximal the driver's position. Turn signal control lever 140 is electrically wired to warning sounder 20 such that sounder 20 can only operate when control lever 140 is positioned in the left or right turn position.

We claim:

1. A vehicle blind spot detector for indicating to the driver of a first vehicle impending contact with another vehicle, the first vehicle comprising:
   at least one infrared ranging circuit having an infrared light emitter and an infrared light detector for extended range sensing of reflected infrared light from said other vehicle converging from one side of said first vehicle, the detector being disposed externally on a corresponding side of the first vehicle, facing said other vehicle;
   a timed trigger switch responsive to the infrared light detector for generating a delayed detector response after a given delay;
   a short range ultrasonic ranging circuit responsive to the delayed detector response for ultrasonically measuring the distance to the other vehicle, disposed externally on a corresponding side of the first vehicle, facing said other vehicle;
   an alarm operatively responsive to the ultrasonic ranging circuit for indicating potential contact with a converging vehicle to the driver of the first vehicle when said other vehicle is within a given range from the first vehicle.

2. Vehicle blind spot detector according to claim 1, wherein said alarm further comprises a digital display responsively coupled to said ultrasonic ranging circuit for displaying digitally the measured distance.

3. Vehicle blind spot detector according to claim 1, wherein said alarm further comprises a buzzer responsively coupled to said ultrasonic ranging circuit for audibly alerting the driver of the first vehicle to said other vehicle being within a give range.

4. Vehicle blind spot detector according to claim 1, including at least two vehicle blind spot detectors disposed respectively at the left and right hand side of the vehicle.

5. Vehicle blind spot detector according to claim 1, wherein said alarm further comprises a pointing light indicator for pointingly indicating the respective side of the first vehicle facing the other vehicle.

6. Vehicle blind spot detector according to claim three, wherein said buzzer further comprises means for operating only during operation of said vehicle's turn signal.

7. Vehicle blind spot detector according to claim 1, wherein said given delay is under three seconds.

8. Vehicle blind spot detector according to claim 1, wherein said infrared ranging circuit further comprises infrared energy sensitivity at or above 8000 angstroms.

9. Vehicle blind spot detector according to claim 1, wherein said infrared ranging circuit further comprises an infrared light emitting diode coupled to an infrared sensitive photo darlington.

* * * * *